United States Patent Office 3,253,184
Patented May 24, 1966

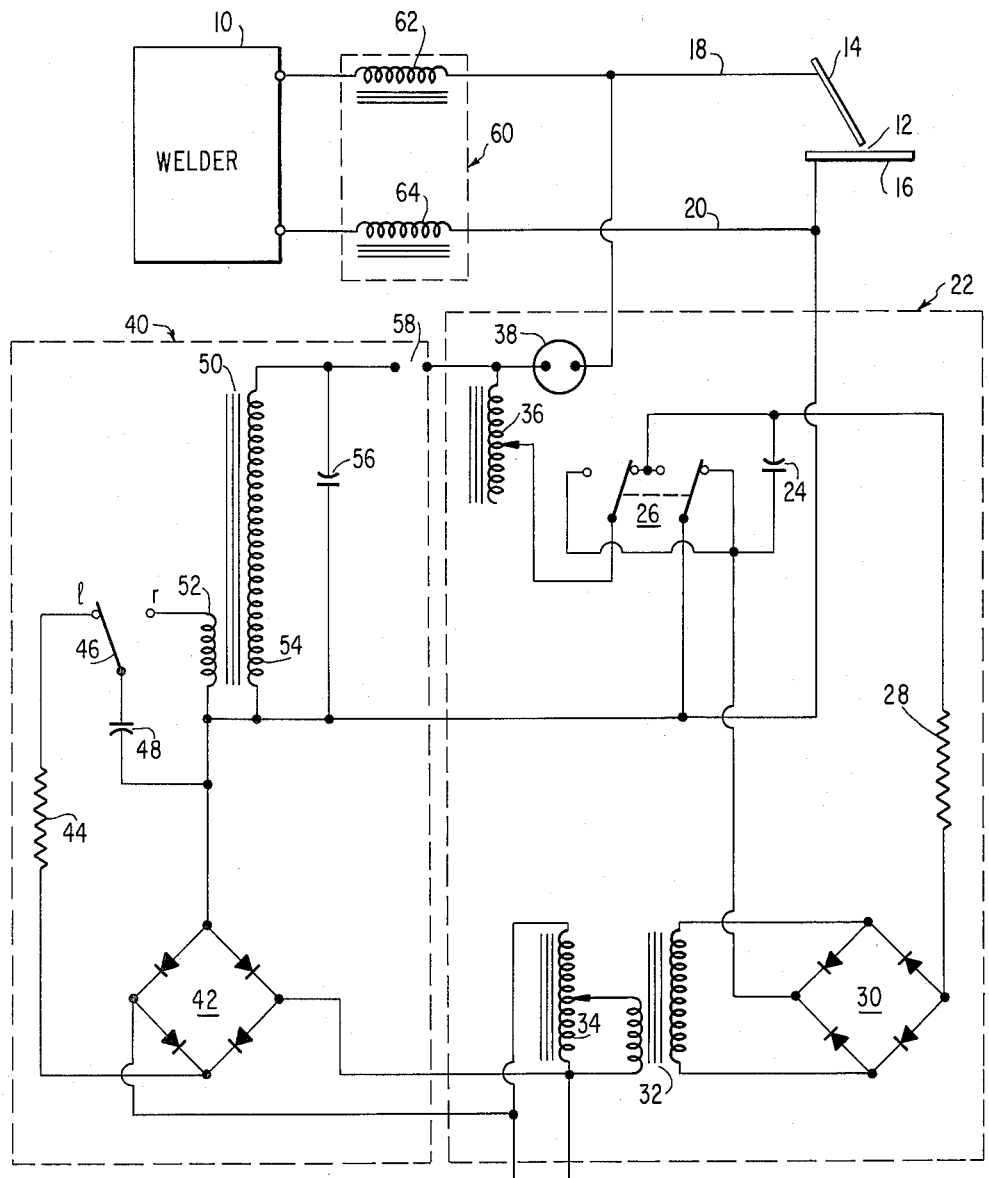

3,253,184
ARC INITIATING SYSTEM FOR AN ARC WELDER
Gerhard K. Willecke and Don J. Corrigall, Appleton, Wis., assignors to Miller Electric Mfg. Co., Appleton, Wis.
Filed July 19, 1963, Ser. No. 296,288
8 Claims. (Cl. 315—173)

This invention relates to improvements in arc initiating systems for use in arc welding.

One of the problems encountered in sophisticated arc welding processes is reliable arc initiation. In the prior art a common approach to this problem is to utilize a high frequency generator, usually of the spark gap type, and introduce the high frequency through a series coupling coil to the output lead of the welder. By the use of a sufficiently high radio frequency voltage, a damped continuous wave spark discharge can be made to ionize the air gap and allow the welding power supply to establish the welding arc. This common prior art method introduces radio interference problems, but is usually quite satisfactory when the starting weld power instantly available is of reasonably high magnitude such as the case when welding is being done at currents in excess of 25-50 amperes. However, the welding art has progressed to the point where extremely thin gauge material (for example, less than 10 mil) can be welded very successfully. In this type of welding it is extremely difficult to start an arc at the current available since sufficient energy is not available to bring the work up to welding temperature. One known procedure for welding thin gauge material is to start and maintain the welding arc on a separate starting tab and is not satisfactory for all types of welding, for example, in inert gas arc spot welding this procedure could not be followed.

It has been attempted in the prior art to use capacitor energy storage and discharge for initiation of arcs at low welding currents. However, these efforts have been unsuccessful primarily due to the sudden energy input into the arc space which has resulted in excessive blast effects.

It is an object of the present invention to provide an arc initiating device having controlled energy storage and controlled energy discharge which can be selectively triggered to produce an initial burst of energy of sufficient magnitude to initiate the arc but whose polarity, magnitude and discharge time can be selectively controlled so that no damage will be done the work by the initial energy blast. It is a further object to provide a blocking circuit that will not only block the energy burst from entering the welder power supply, but will also favorably affect the characteristics of the welding circuit.

The foregoing and other objects, features and advantages of the invention will be apparent from the following more particular description of a preferred embodiment of the invention, as illustrated in the accompanying drawing.

In the drawing the single figure is a circuit diagram which will illustrate the inventive concept in the operation of the circuit of this invention.

As shown in the accompanying drawing the arc welding apparatus includes a conventional power supply 10 for supplying potential to establish an arc 12 between an electrode 14 and a workpiece 16. The electrode 14 is connected to the power supply 10 by the welder output lead 18 and the workpiece 16 may be electrically connected by conductor 20.

The arc initiating system of this invention is usable with the conventional arc welding apparatus described above and includes a separate arc initiating circuit 22 including an electrical energy storage means controllable in magnitude and duration of a selectively releasable energy blast. A capacitor 24 is used for energy storage, that is the electrical impulse energy which is used to create the heat energy in the arc is stored in this capacitor. The capacitor 24 is a large energy storage type of capacitor with the capacitance preferably in the order of several hundred microfarads at several hundred volts. As an example, a commercial unit contructed in accordance with this invention utilizes a capacitor with the rating of five hundred microfarads at nine hundred volts.

A polarity reversing switch 26 is connected across the capacitor 24 to allow for switching of the polarity for selecting the polarity of the capacitor discharge through the arc zone. Depending on the dynamic characteristics of the welding machine one polarity would generally prove superior to the other for any particular set of welding conditions.

The capacitor charging circuit for capacitor 24 includes a resistance 28 and a rectifier 30. Resistance 28 serves to limit the current drawn from rectifier 30 to protect the rectifier from excessive overload. The rectifier 30 is shown as a full wave rectifier although a half wave rectifier could be used. The function of this rectifier is to convert the power output from a transformer 32 from A.C. to D.C. for charging the capacitor 24. The transformer 32 steps up the voltage from transformer 34 in order that the capacitor 24 may be charged to a level above normal line voltage. Transformer 34, in turn, is energized from a source of line voltage as shown. It is also noted that transformer 34 is variable in order to control the amount of energy stored in capacitor 24. The variable transformer 34 provides a continuous control of this charging voltage by controlling the primary and, thus, the secondary voltage of transformer 32. Since the amount of energy stored in capacitor 24 is given by the equation $Q = \frac{1}{2} CV^2$ where Q equals energy in joules (watts-seconds), C equals capacitance in farads and V equals volts, it is apparent that by adjusting the setting of variable transformer 34 that the amount or quantity of stored energy in capacitor 24 can easily be controlled by the variable charging voltage.

The capacitor 24 is connected into the welder circuit in series with an inductance 36 and a spark gap 38 to provide for pulse generation across the arc zone. The inductance 36 may be of the variable type as shown and the gap 38 may be filled with inert gas. The inductor 36 serves to regulate the discharge time of the energy from capacitor 24. By regulating and controlling this energy discharge the pulse energy is distributed over a longer time interval and the peak current is reduced. Obviously, if the peak current is excessive the discharge of the capacitor 24 will create a blast effect and an arc will not be initiated.

The gas filled spark gap 38 effectively acts as a switch. In other words, until gap 38 is bridged the energy will be stored in capacitor 24 and when the gap is ionized by a spark the capacitor 24 will discharge its energy across this gap into the welding circuit. The purpose of bathing the gap 38 in an inert atmosphere (argon, for example) is to provide for greater energy handling capacity. The gap may be either a single gap or a double gap as desired.

For triggering the release of energy from capacitor 24 a selective triggering circuit indicated generally at 40 is provided. This circuit includes a rectifier 42 connected across the line voltage to provide a D.C. energy source for charging a capacitor 48. Rectifier 42 may either be a full wave rectifier as shown or a half wave rectifier. Capacitor 48 is an energy storage capacitor which is charged by the output voltage of rectifier 42 through resistor 44 when control switch 46 is in its normal position making contact with pole 1. Resistor 44 limits the charging current of the capacitor 48 and thus protects the rectifier 42 from overcurrent. By throwing switch 46 to pole r the capacitor 48 is connected in circuit for discharging through primary 52 of a high voltage step up transformer 50 which also has a secondary 54. This transformer may conveniently be a spark coil similar to the type generally used in automobile ignition systems. When the capacitor 48 discharges across primary 52 a high voltage pulse is produced in the secondary 54 of the transformer 50 and must be sufficiently high so that spark gap 58 breaks down. Spark gap 58 is in series with gap 38 and the gap between the electrode 14 and work 16 and a breakdown of any gap will also cause the breakdown of all series gaps. In other words, gap 58 controls the conduction of the remainder of the circuit and triggers the energy release after capacitance 56 has sufficient charge voltage. The spacing of gap 58 is proportional to the voltage intensity of the spark and determines how the spark will jump across the gap. The gap may be adjustable and a preferable gap spacing would be about 0.12 to 0.18 inch although different gap configurations and spacings may be used. The gap 58 spacing, however, will always be greater than the spacing of gap 38. When the condenser 56 is charged to a value to bridge gap 58 the condenser 56 is discharged across the gap and creates a high voltage, steep wave front spark also bridging narrower gap 38 and thereby triggering the discharge of energy from energy storage capacitor 24 through the variable inductance 36 to initiate the arc 12. In the operation of the triggering circuit 40, after condenser 48 is charged with switch 46 in the normally closed position to pole 1 the switch 46 is moved to pole r to discharge the condenser across the primary 52 of transformer 50 thereby causing high voltage to be stored in capacitor 56 up to the point where wide spark gap 58 breaks down at which time the capacitor 56 will be discharged across the gap also bridging smaller gap 38 and allowing the capacitor 24 to discharge. The high impedance 54 of the secondary of transformer 50 blocks the discharge of capacitor 24 from backtracking through gap 58 even though it is conducting at the same time as gap 38.

To make the arc initiating circuit effective a blocking circuit means 60 is provided between the welder power source 10 and the arc initiating circuit so that the energy provided by the initiating circuit capacitors 24 and 56 will not go into the welder 10. Due to the blocking circuit means being in the welding circuit, it will also affect the welding circuit characteristics and, therefore, must be carefully designed to assert a favorable influence on these characteristics. This blocking circuit basically includes RF power choke 62 and reactor 64.

There are in effect two pulses which are blocked by the blocking network and kept out of the welder. The breakdown of gaps 58 and 38 caused by the high voltage impulse from the triggering circuit 40 puts a very steep-sided voltage wave front of very short duration across the welder terminals. This pulse is effectively blocked by the RF power choke 62 preferably making use of relatively few turns of heavy copper bar around a ferrite type core. As soon as gap 38 breaks down the power capacitor 24 discharges and its discharge rate is controlled by the variable inductance 36. Power choke 62 is not very effective in blocking this longer pulse from the welding machine, and, therefore, the reactance 64 is placed in the output circuit to take over. This choke has high inductance which also affects the welding machine characteristics. The reactance 64 has a distributed capacitance which is not effective in blocking the short trigger pulse, however.

If desired, additional capacitances may be connected across the line and across the reactance to protect the welder from the spark and improve dynamic characteristics of the machine. Other circuit protective devices, switches, pilot lights, etc., would be furnished on a commercial embodiment. However, the basic inventive concept is provided with the circuit illustrated.

The operation of the invention will now be described. The amount or magnitude of the energy burst provided from energy storage capacitor 24 is preset and controlled by controlling the charge voltage through setting of the variable transformer 34, and the duration of the energy burst is controlled by controllable inductance 36. These two values may be set depending on the particular welding job being performed. Capacitor 48 is charged with switch 46 at pole 1. To initiate the arc switch 46 is thrown (by automatic means if desired) to pole r discharging capacitor 48 into the primary 52 of transformer 50 creating a high voltage in the secondary of transformer 50 charging capacitor 56 up to the breakdown point of wide gap 58. Gap 58 breaks down and at this time the capacitor 56 discharges through gap 58. Since gap 38 has a lower voltage breakdown point than gap 58 because of its narrower spacing and gas atmosphere, this gap also breaks down thereby placing not only the energy from relatively small capacitor 56 into the arc circuit as a high voltage steep wave front but also releasing the energy from power storage capacitor 24, which has been slowed down by the inductance 36 across the now bridged gap 38, into the arc zone as an arc starting pulse of controlled magnitude and duration. The initial steep front wave form and the following longer pulse are effectively blocked from the welder 10 by the radio frequency power choke 62 and reactor 64, respectively, of the blocking circuit 60. Thus, the starting burst of energy in a controllable form is selectively initiatable by trigger circuit 40 and controllable in amount by transformer 34 and in duration by variable inductance 36 and it may be selectively placed in the circuit across the arc 12 and blocked from the welder 10 by means of blocking circuit 60.

While the invention has been particularly shown and described with reference to a preferred embodiment thereof, it will be understood by those skilled in the art that various changes in form and details may be made therein without departing from the spirit and scope of the invention.

We claim:

1. An arc initiating system for an arc welder of the type having a welder power supply electrically connected by a welding circuit to an electrode and a workpiece to cause electrical arcing sufficient to allow the welding power supply to control a welding operation comprising:
    (a) arc initiating circuit including electrical energy storing means, and spark gap means electrically separating the arc initiating circuit and the welding circuit,
    (b) a power supply for the energy storing means including means controlling and varying the amount of energy stored by said electrical energy storing means,
    (c) selectively initiatable switch controlled separate triggering circuit to release the electrical energy of said energy storing means across said spark gap as a burst of energy sufficient to initiate the arc,
    (d) means forming a series circuit with said energy storage means, said spark gap, said electrode and said workpiece for selectively controlling and varying the discharge time of the burst of energy from the energy storage means, and
    (e) blocking means in the welder circuit to block the energy burst from passing to the power supply and thereby causing the energy burst to be applied across the welding arc.

2. An arc initiating system for an arc welder as defined in claim 1 wherein the electrical energy storage means comprises a power capacitor.

3. An arc initiating system for an arc welder of the type having a welder power supply electrically connected by a welding circuit to an electrode and a workpiece to cause electrical arcing sufficient to allow the welding power supply to control a welding operation comprising:

(a) arc initiating circuit including electrical energy storing means, and spark gap means electrically separating the arc initiating circuit and the welding circuit, (b) a power supply for the energy storing means including means controlling and varying the amount of energy stored by said electrical energy storing means, (c) selectively initiatable switch controlled separate triggering circuit to release the electrical energy of said energy storing means across said spark gap as a burst of energy sufficient to initiate the arc, said selectively initiatable triggering circuit including an energy storage means, at least one spark gap that can be jumped by discharge of energy, and a switch controlling the selective initiation of the triggering means, (d) means forming a series circuit with said energy storage means, said spark gap, said electrode and said workpiece for selectively controlling and varying the discharge time of the burst of energy from the energy storage means, and (e) blocking means in the welder circuit to block the energy burst from passing to the power supply and thereby causing the energy burst to be applied across the welding arc.

4. An arc initiating system for an arc welder of the type having a power supply electrically connected in a welding circuit to an electrode and a workpiece to cause electrical arcing for welding purposes, the arc initiating system being a separate circuit comprising;

(a) a power capacitor for storing electrical energy in said arc initiating circuit, (b) controllable variable voltage means for charging said power capacitor with a controllable amount of electrical energy, (c) an arc initiating control spark gap between said capacitor and said welding circuit for controlling the release of energy from the capacitor, (d) a variable inductance means connected in series with said power capacitor, said spark gap, said electrode and said workpiece for controlling the duration of the released energy burst, (e) a separate selectively actuatable switch controlled triggering circuit for ionizing said arc initiating control spark gap, and (f) blocking circuit means in the welder circuit to block the energy burst from passing to the power supply and thereby causing the energy burst to be applied across the welding arc.

5. An arc initiating system for an arc welder of the type having a power supply electrically connected in a welding circuit to an electrode and a workpiece to cause electrical arcing for welding purposes, the arc initiating system being a separate circuit comprising:

(a) a power capacitor for storing electrical energy in said arc initiating circuit, (b) controllable variable voltage means for charging said power capacitor with a controllable amount of electrical energy, (c) an arc initiating control spark gap between said capacitor and said welding circuit for controlling the release of energy from the capacitor, (d) a variable inductance means between said capacitor and said welding circuit for controlling the duration of the released energy burst, (e) a separate selectively actuatable switch controlled triggering circuit for ionizing said arc initiating control spark gap, (f) blocking circuit means in the welder circuit to block the energy burst from passing to the power supply and thereby causing the energy burst to be applied across the welding arc, and (g) said triggering circuit comprising, a triggering circuit spark gap connected in series with the welding arc and said arc initiating control spark gap, said triggering circuit spark gap being bridgeable only by a higher voltage than the arc initiating control spark gap, power storage means for the triggering circuit spark gap, and control means for selectively connecting the power storage means to the triggering circuit spark gap.

6. An arc initiating system for an arc welder as defined in claim 5 wherein said blocking circuit means includes a power choke and a reactor to block both high voltage short duration pulses and lower voltage longer duration pulses from entering the welder power supply.

7. An arc initiating system for a welder as defined in claim 5 further comprising, a polarity reversing switch connected around the power capacitor for controlling the polarity of the arc initiating voltage.

8. An arc initiating arrangement for an arc welder of the type having a power supply electrically connected to an electrode and a workpiece to provide an electrical arc therebetween for welding purposes, the arc initiating arrangement comprising;

(a) a separate arc initiating circuit including a power storage capacitor for storing electrical energy, (b) settable variable voltage means electrically connected to the power storage capacitor for charging the same with varying amounts of electrical energy, (c) a polarity reversing switch connected around the the power storage capacitor, (d) an inductance connected in series between the power storage capacitor and the arc welding circuit, (e) an ionizable inert gas bathed spark gap connected in series between the power storage capacitor and the welding circuit, (f) another trigger circuit spark gap connected in series with the welding arc and an arc initiating control spark gap, (g) a power supply selectively connectable to the trigger spark gap, (h) and a blocking circuit in the welder power supply including a power choke and a reactor to block pulses originating in the separate arc initiating circuit from entering the welder power supply.

References Cited by the Examiner

UNITED STATES PATENTS

| 2,551,101 | 5/1951 | Debenhamet et al. | 315—209 |
| 2,558,102 | 6/1951 | Roberts | 315—173 X |
| 2,880,376 | 3/1959 | Tajbl et al. | 315—173 X |
| 2,938,147 | 5/1960 | Rose | 315—209 |

OTHER REFERENCES

Kerchner Alternating-Current Circuits 4th edition, Wiley, 1960.

JAMES D. KALLAM, *Acting Primary Examiner.*

DAVID J. GALVIN, JOHN W. HUCKERT, *Examiners.*

D. E. PITCHENIK, *Assistant Examiner.*